United States Patent [19]

Stokes

[11] Patent Number: 5,627,950
[45] Date of Patent: May 6, 1997

[54] REAL-TIME THREE-DIMENSIONAL COLOR LOOK-UP TABLE INTERACTIVE EDITOR SYSTEM AND METHOD

[75] Inventor: Michael Stokes, Cupertino, Calif.

[73] Assignee: Apple Computer, Inc., Cupertino, Calif.

[21] Appl. No.: 305,959

[22] Filed: Sep. 16, 1994

[51] Int. Cl.$^6$ ................................................ G06T 11/00
[52] U.S. Cl. ......................... 395/131; 395/326; 395/348; 358/518
[58] Field of Search ............................ 395/131, 155, 395/159; 358/500, 518; 356/402; 364/526

[56] References Cited

U.S. PATENT DOCUMENTS

| | | | |
|---|---|---|---|
| 4,328,515 | 5/1982 | Wellendorf | 358/523 |
| 4,639,770 | 1/1987 | Jung et al. | 358/527 |
| 4,941,038 | 7/1990 | Walowit | 358/518 |
| 5,087,126 | 2/1992 | Pochieh | 356/402 |
| 5,212,546 | 5/1993 | Arazi et al. | 358/518 |
| 5,257,097 | 10/1993 | Pineau et al. | 358/500 |
| 5,268,754 | 12/1993 | Van de Capelle et al. | 358/527 |
| 5,276,779 | 1/1994 | Statt | 395/109 |
| 5,309,257 | 5/1994 | Bonino et al. | 358/504 |
| 5,317,678 | 5/1994 | Okawara et al. | 395/126 |
| 5,416,890 | 5/1995 | Beretta | 395/131 |

FOREIGN PATENT DOCUMENTS

| | | |
|---|---|---|
| 0310891 | 4/1989 | European Pat. Off. . |
| 0377386 | 7/1990 | European Pat. Off. . |
| 0441609 | 8/1991 | European Pat. Off. . |
| 0535931 | 4/1993 | European Pat. Off. . |

OTHER PUBLICATIONS

Stone et al., "Color Gamut Mapping and the Printing of Digital Color Images", *ACM Transactions on Graphics*, vol. 7, No. 4, Oct. 1988, pp. 249–292.

Foley et al., *Computer Graphics: Principles and Practice*, Addison–Wesley Publishing Company, Inc., 1990, pp. "Plate II.4, II.5 and II.14".

Robertson, "Visualizing Color Gamuts: A user Interface for the Effective Use of Perceptual Color Spaces in Data Displays", *IEEE Computer Graphics & Applications*, 1988, pp. 50–64.

Robertson et al., "The Application of Perceptual Color Spaces to the Display of Remotely Sensed Imagery", *IEEE Transactions on Geoscience and Remote Sensing*, vol. 26, No. 1, Jan. 1988, pp. 49–59.

*Primary Examiner*—Heather R. Herndon
*Assistant Examiner*—Stephen Hong
*Attorney, Agent, or Firm*—Burns, Doane, Swecker & Mathis, L.L.P.

[57] ABSTRACT

A method and apparatus for editing color LUTs that are utilized for converting color data from a first display device having a corresponding first color space to a second display device having a corresponding second color space is described. The method of the present invention includes initially displaying on an editor display screen, a graphical representation of a first draft of a previously created color LUT. The graphical representation of the previously created table is embodied as a lattice structure, where each element in the lattice structure represents one or more color values stored in the color LUT. Also displayed on the editor display screen is a set reference images and a set of sample images. The reference images represent the appearance that the user wants the color image to look like on the second display device. Initially, sample images reflect the manner in which the reference image would be displayed on the second device when processed through the previously created color LUT. In an editing session, the user has the ability to edit the manner in which the sample image will appear on the second display device by moving elements within the graphical representation thereby causing corresponding changes in the previously created color LUT. After making the changes to the graphical representation, the sample images are again generated by processing the color data for the reference image through the edited color LUT. The editing session continues, i.e. manipulating the graphical representation, until the color table has been edited such that the sample images appear to have the same color as the reference images.

15 Claims, 3 Drawing Sheets

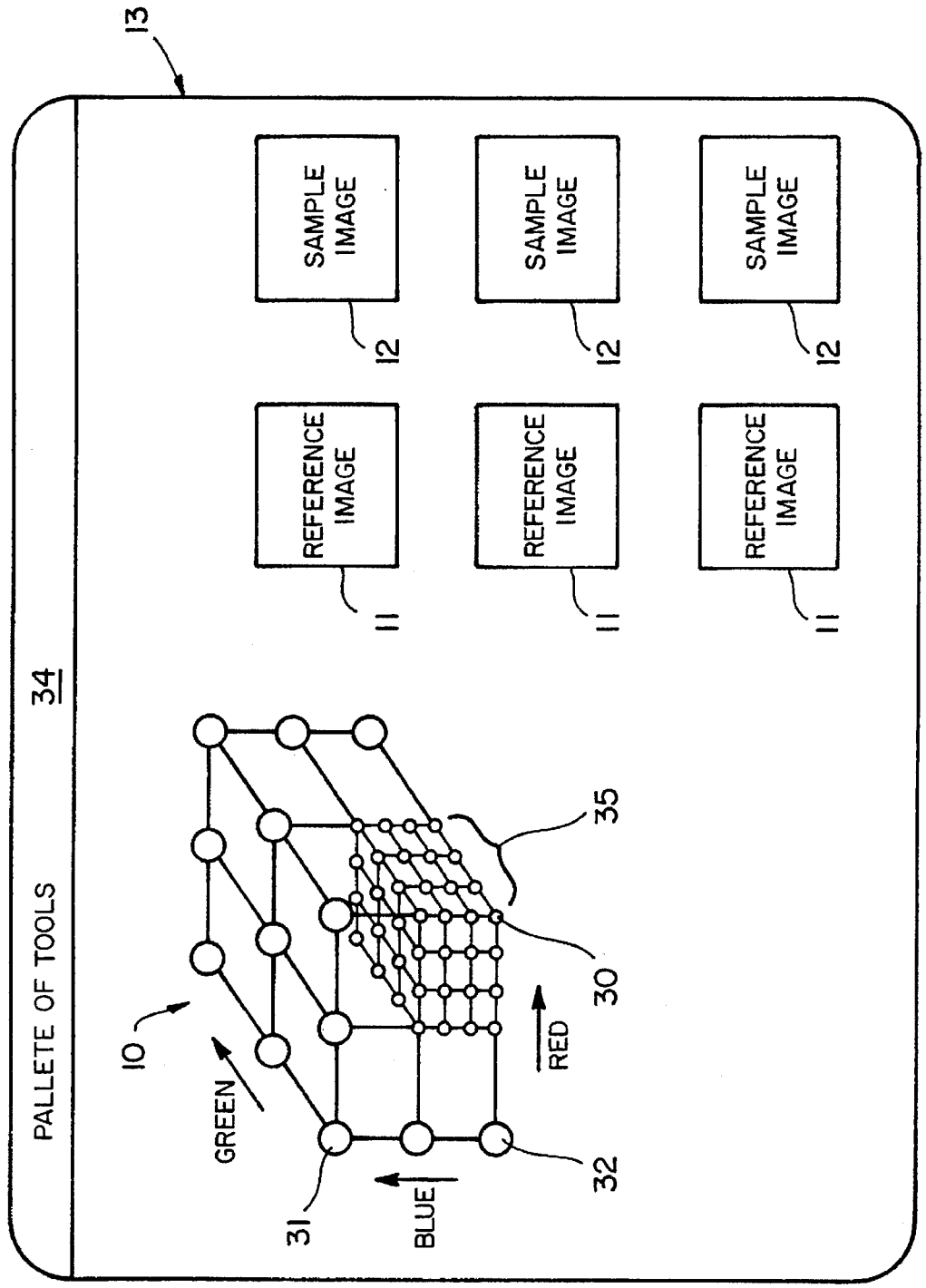
FIG_1

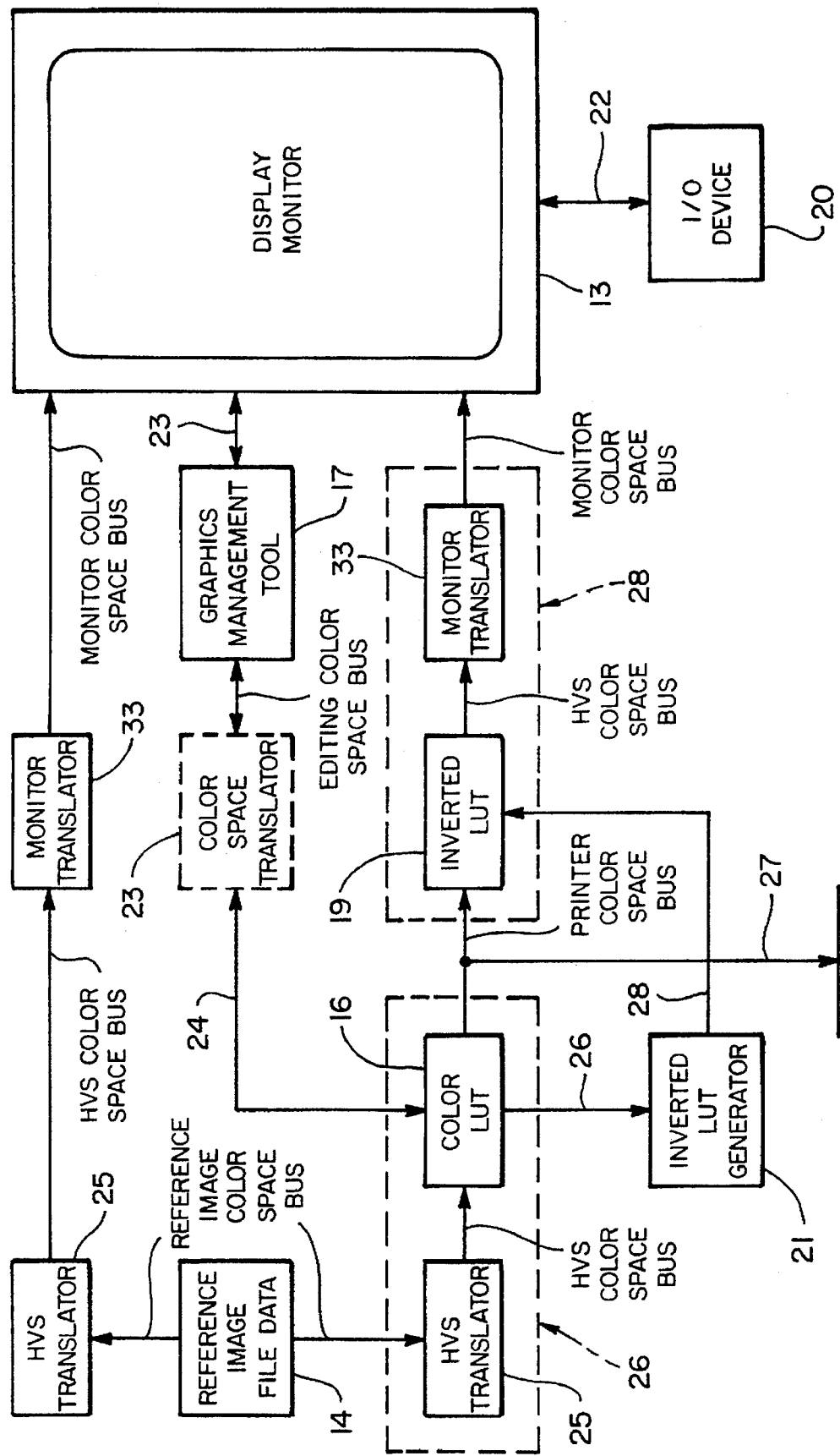
FIG_2

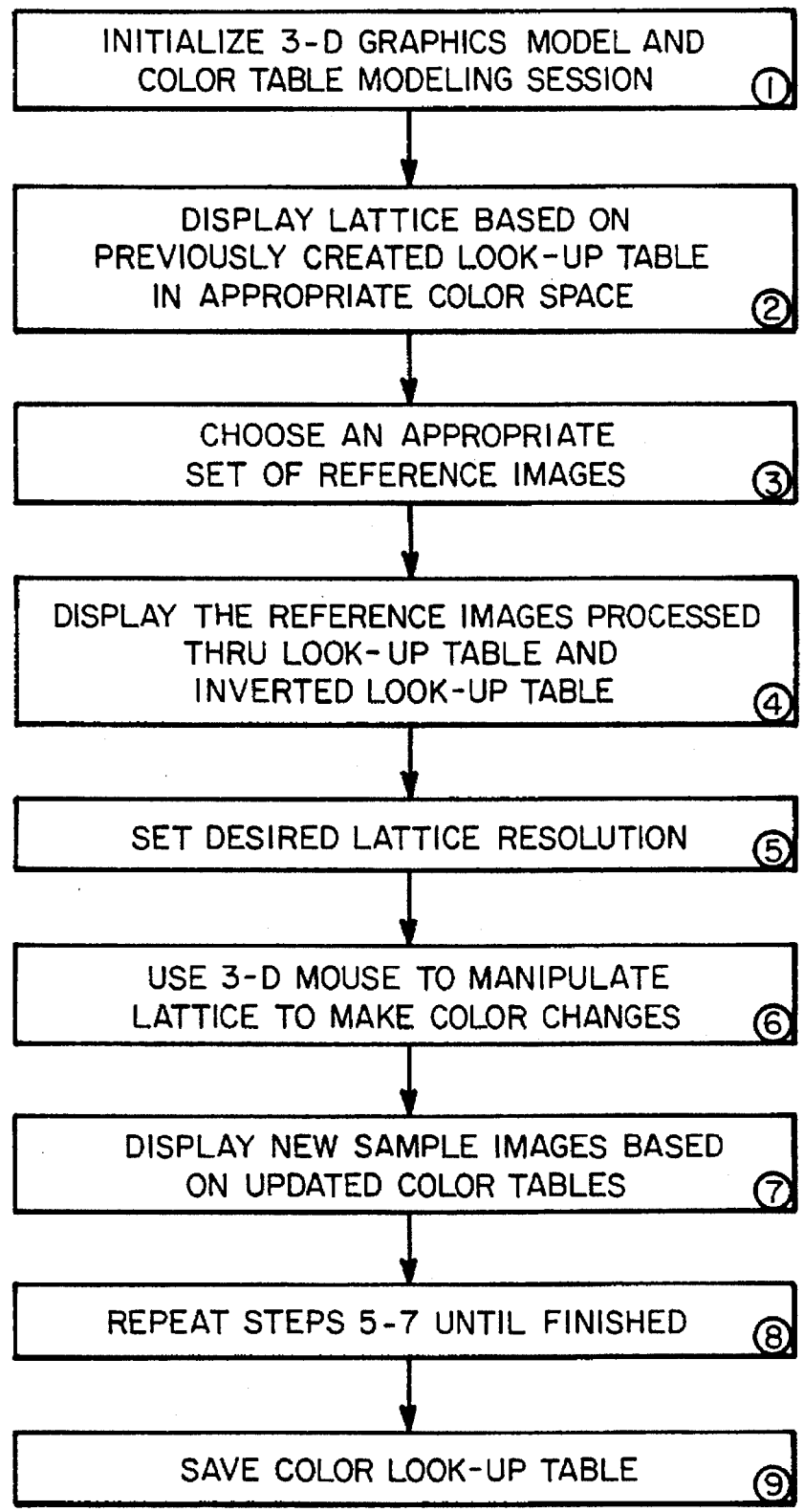
FIG_3

REAL-TIME THREE-DIMENSIONAL COLOR LOOK-UP TABLE INTERACTIVE EDITOR SYSTEM AND METHOD

FIELD OF THE INVENTION

The present invention relates to computer color graphics, and more particularly to translating color information when transmitting color information to more than one device.

BACKGROUND OF THE INVENTION

In a computer system having color graphics, it is desirable to display color data on many types of devices such as computer display screens and printers. However, due to the inherent displaying and color range differences between display devices, color data that represents a certain color in one device, does not match the same color in another. In order to ensure color matching between devices, it is necessary to translate color data when transmitting it between each device. There are several methods in which this is presently done and, in general, most methods includes generating a three-dimensional color look-up table (LUT). The color LUT functions to translate color data corresponding to a first display device (referred to as the source device) to color data corresponding to a second device (referred to as the destination device). The LUT stores color values corresponding to the destination device and functions such that when it is indexed, it provides the destination device with translated color data.

Presently, there are two common methods used to generate a color LUT. The first method relates to translating color data between a printer (destination device) and a display (source device). This method involves printing out a large number of color swatches from the printer. Often times, as many as 1500 color swatches are printed. The colors are measured and then mapped to a corresponding color in the, source device's range of colors (also referred to as the device's color gamut) to generate the color LUT.

Since this process tends to be very time consuming another method developed involves printing and measuring fewer color swatches. This method utilizes algorithms to characterize the destination device. In this method, a reduced number of color swatches are taken and measured to obtain some initial color values for the LUT. These values are inserted into the mathematical algorithm representing the destination device to generate the remainder of the color values in the LUT.

The problem with both of these methods is that the LUT is rarely exactly right the first time it is created. Instead, it is typically necessary to adjust the color LUT to make it visually acceptable. This process generally involves changing values within the color LUT in some manner and then printing out more swatches of color on the printer to compare them with the display color. Often times this procedure involves many days of reiterative fine tuning steps.

The present invention is a method and system for editing a color LUT that does not require repeatedly printing out and measuring colors on the destination display device. Instead, the present invention provides the user a perceptually intuitive real-time method and system to edit color LUTs.

SUMMARY OF THE INVENTION

The present invention is a method and system for editing a three-dimensional color look-up table (LUT) used for translating a first display device's color data to a second display device's color data. The present invention allows a user to perform real-time edits to the color LUT, thereby reducing color LUT editing time.

In the method of the present invention, a display screen is used to perform LUT editing. Initially, a three-dimensional graphical representation of the previously created LUT is displayed by the display screen. The graphical representation comprises elements connected together by three axes disposed in three dimensions. Each of the axes in the graphical representation corresponds to components associated with the color values stored in the LUT. Further, each element in the structure represents at least one color value within the color LUT. In the preferred embodiment, the graphical representation is a three-dimensional lattice structure. In one three dimensional embodiment of the present invention, the graphical representation is displayed in an RGB color space where one axis corresponds to red, another green, and another blue.

In addition to the graphical representation, a set of reference images are displayed. The reference images represent the manner in which the user wants the color to appear on the second display device, i.e. the manner in which the color is displayed by the source device.

In addition to the reference images, a corresponding set of sample images are displayed. The sample images correspond to the manner in which the reference images would be displayed on the second device if processed through the color LUT. Sample images are generated by first creating an inverted color LUT corresponding to the original LUT and then processing the color data corresponding to the reference image through both of the LUT and its corresponding inverted LUT.

The method of the present invention includes initiating an LUT editing session, choosing a color space to edit in, and setting the resolution of the graphical representation. Choosing a higher resolution setting causes more elements to be displayed in the graphical representation (i.e. more color values), allowing for finer color value adjustments. A lower resolution graphical representation displays a small number of elements and allows the user to make coarser adjustments.

The LUT is edited by moving the elements within the graphical representation. Moving the elements causes a corresponding change in the color values stored in the LUT. The color values are changed depending on the direction in which the elements are moved with respect to the graphical representation's axes.

After manipulating the graphical representation, a new set of sample images are created and displayed by reprocessing the reference image color data through the edited LUT and a corresponding edited inverted LUT.

The editing process is repeated until acceptable results are achieved. The present invention also includes editing tool options such as rotating, hiding portions of, and zooming-in and expanding portions of the graphical representation.

The system of the present invention includes a display screen for displaying the graphical representations, the sample images and the reference images. The system also includes an I/O interface device for providing a means for the user to perform editing tasks on the graphical representation displayed on the screen. The system also includes memory storage used for storing the LUT, the inverted LUT, and the color data corresponding to the reference images. Further, the system includes a means of generating an inverted LUT when given an LUT.

In order to display the LUT as a multi-dimensional graphical representation the present invention includes a graphical management tool that: 1) generates the graphical representation of the LUT, 2) manages all editing tasks, 3) translates changes in the graphical representation into changes in the LUT, and 4) updates the LUT. In order to implement the present invention, a three-dimensional graphical application is required, however it is not necessary to include the graphical application in the system of the present invention. Thus, in one embodiment of the present invention, the graphical management tool does not actually perform the graphical editing and display. Instead, the management tool interfaces with a separate graphical application tool to provide, all graphical tasks for the present invention.

BRIEF DESCRIPTION OF THE DRAWINGS

FIG. 1 illustrates the images displayed on a display screen to facilitate the method and system of the present invention.

FIG. 2 illustrates an embodiment of the system of the present invention.

FIG. 3 is a flow chart providing the steps to the method of the present invention corresponding to the embodiment of the system of the present invention shown in FIG. 2.

DETAILED DESCRIPTION

A method and system for editing color LUTs used in computer systems is described. In the following description, numerous specific details are set forth, such as specific color spaces, specific types of I/O interfaces, manners in which the present invention is displayed on the computer screen, etc., in order to provide a thorough understanding of the present invention. It will be obvious, however, to one skilled in the art that these specific details need not be employed to practice the present invention. In other instances, well-known computer system architectures have not been described in detail in order to avoid unnecessarily obscuring the present invention.

In discussing color reproduction in a computer system each display device is characterized to have a range or gamut of colors that define their corresponding color space. In general, the human visual system (HVS) color space has the largest gamut since this is what defines what is ultimately perceived by the user of the computer system. Display screens are generally defined in a red, green, blue (RGB) color space which has a smaller gamut size than the HVS color space. Finally, printers, in general, have a smaller color space than the display, and are often times defined by a cyan, magenta, yellow, and black (CMYK) color space.

In a computer system it is often necessary to perform color matching to ensure that a color image displayed on a first device having a corresponding color space appears as the same color image on the second device having a corresponding second color space. For instance, when a color value corresponding to a source color space (the transmitting color space device) is transmitted to a destination color space (the receiving color space device) it is necessary to translate it such that both colors will appear the same on both display devices. To facilitate matching colors between one color space and another, color look-up tables (LUTs) are created.

Typically, the manner in which color information is translated from a source color space to a destination color space is that the color data from the source device is initially translated to the HVS color space. If the source device is properly calibrated, this is a well-known translation and may be performed either by translation equations or by a standardized color LUT.

After translating the source color space to the HVS color space, the information is once again translated. This time the information is translated from the HVS color space to the destination device color space. This transformation is accomplished by using the color LUT that corresponds to the destination device.

Color LUTs store the color values corresponding to the destination device. The destination color values stored in the color LUTs are accessible by the HVS color space value. When the HVS color value accesses the LUT, the LUT provides a corrected color value to the destination device. In order for the destination device to transmit color data back to the source device, an inverted color LUT is created using the information from the initial color LUT.

Once an initial color LUT has been created, it is generally necessary to subsequently adjust the table so that a good color match occurs between devices. The present invention is a method for editing the color LUT in a easy and intuitive manner on the display screen, thereby avoiding the prior art method of printing and reprinting color swatches in order to adjust the LUT until it is visually acceptable.

In the preferred embodiment, the present invention is implemented such that a display screen is the source device. In addition, the display screen functions as the display area in which editing is performed. The destination device is a printer. As described above, a color LUT has already been created by some other method.

FIG. 1 illustrates the images displayed on the editing screen when performing the method of the present invention. Display screen 13 shows a three-dimensional graphical representation 10 of the previously created color table. As illustrated in FIG. 1, the graphical representation is shown as a lattice structure. The lattice structure is made up of a group elements—i.e spheres—each sphere representing a corresponding color value in the color LUT. Each of the spheres are connected together by an axis to another sphere.

The number of axes in the graphical representation correspond to the number of components of the color value. For instance, an RGB color value has three components; red, green, and blue. As illustrated in FIG. 1, each component corresponds to a different axis. Moving a sphere along a single axis changes only that component whereas moving a sphere at some angle with respect to one or more axis, causes changes in one or more components.

It should be noted that although the representation shown in FIG. 1 is an LUT for the RGB color space, it could easily be replaced by any other three-dimensional color space such as an XYZ color space, CIELAB or CIELAB LCh.

Further, the graphical representation shown in FIG. 1 may represent a color space that is different from both the source and destination device. For instance, the user may choose to perform editing in a color space other than that of the source or destination device. This type of embodiment may be employed to simplify the editing process since some color spaces are perceptually easier to edit the graphical representation than others.

Further, since it is impossible to graphically display objects having more than three-dimensions, a color space LUT having more than three components may be displayed by displaying only three components of the color value at a time.

In the embodiment shown in FIG. 1, the graphical representation is that of an RGB color space. As can be seen, the red component axis is the x-axis, the blue component axis is the y-axis, and the green component axis is the z-axis. Although actual colors are not shown in the graphical representation illustrated in FIG. 1, the display screen displays the lattice structure in color. Further, each of the lattice spheres are displayed in the color corresponding to its color value. For instance, color sphere 30 is displayed in full-intensity red, color sphere 31 is displayed in full-intensity blue and sphere 32 is illustrated in white, i.e. no color.

FIG. 1 also shows a tool palette bar 34. This type of tool palette is well known in the art. The user employs tool bar 34 to initiate different commands during the editing session. For example, some of the options that the present invention offers is the ability to "zoom-in" and expand some of the areas within the lattice structure. By way of example, the lattice structure can be displayed to show a few spheres, each sphere representing a large group of color values. With the lattice structure in this state, the user has the option of performing coarse edits. Thus, moving one sphere within the lattice structure causes a corresponding change to all of the color values within the color LUT that correspond to that single sphere.

Alternately the user has the option to adjust the resolution of the graphical representation. This is accomplished by either increasing or decreasing the number of spheres displayed in the graphical representation. By increasing the number of spheres, each sphere represents fewer color values, thereby increasing the resolution of the graphical representation. This allows the user to make fine adjustment to the color LUT. Decreasing the number of spheres increases the number of color values assigned to each sphere, thus decreasing the resolution of the graphical representation and allowing for more coarse adjustments.

Another editing tool option available in the present invention provides expanding only a portion of the table as illustrated in FIG. 1, indicated by 35. And still another editing tool option allows the user to hide portions of the lattice structure in order to view other otherwise hidden areas within the lattice.

Display squares 11 are for displaying reference images and display squares 12 are for displaying sample image. The reference images corresponds to the manner color is displayed in the source device. The sample images illustrate the same objects as the reference images, however, the color of the sample images are displayed as they would be on the printer using the previously created color LUT, as will be explained in more detail in the following description.

The basic editing concept of the present invention is to match the color of the sample images with the color of the reference images by manipulating the graphical representation of the color LUT. Manipulation of the graphical representation entails moving the spheres, with respect to each of the axes, within the graphical representation. In moving the spheres in lattice structure 10, corresponding color value/s in the previously created color LUT change. After manipulating the lattice structure using the different editing options available from tool bar 34, a new set of sample images are created by processing the color data corresponding to the reference images through the edited color LUT and an edited inverted color LUT. This process is repeated, until the sample images match the reference images.

FIG. 2 illustrates the system of the present invention for displaying the display as shown in FIG. 1. FIG. 2 shows the display screen 13 having an I/O device 20 coupled to it on bus 22. The I/O device is the user interface to the display screen and allows the user to manipulate the lattice structure. There are many different embodiments of I/O devices such as: a mouse, a joystick etc. The I/O device needs to provide the user with the ability to manipulate the spheres in all three dimensions, e.g., a three-dimensional mouse.

Block 17 shown in FIG. 2 represents the graphical management tool that converts the data stored in color LUT 16 into information that causes display screen 13 to display a lattice structure 10 as shown in FIG. 1. Tool 17 also facilitates the manipulation of the spheres of lattice structure 10 along with translating the movement of the color spheres into corresponding changes in color values. The changes in color values are subsequently transmitted to LUT 16 via bus 24 to keep the table updated. Tool 17 also provides the user with the different editing tool options provided by the tool bar as described in conjunction with FIG. 1. For instance, tool 17 performs the operations involving expanding the lattice structure, hiding portions of it, zooming in, in addition to rotating or moving the lattice to allow the user to view the structure from different angles.

The color LUT 16 is memory storage that stores the current color LUT. Initially, the previously created table is stored in memory 16. As the editing session progresses, table 16 is updated by graphics management tool 17.

The color values stored in LUT 16 corresponds to the destination device's color space. The LUT functions translate the HVS color data into the destination color data. In the embodiment shown in FIG. 2, the source device is display screen 13 and the destination device is printer 18. FIG. 2 also includes memory storage for storing inverted color LUT 19. Inverted table 19 performs the opposite of that of table 16, i.e. table 19 converts the printer color data to the HVS color data. Block 21 functions to generate inverted LUT table 19 from LUT 16.

FIG. 2 also shows HVS color space translators 32 and monitor color space translators 33. These translators function to translate input color space information into either the HVS or monitor color spaces. These translators may be either implemented using standardized color tables or using mathematical translation equations.

It should be noted that normally Table 16 and HVS translator 32 are concatenated together such that they are actually viewed as performing a single operation, i.e., translating from the reference image color space to the printer color space. This assumption can be made since HVS translator 32 performs a standardized translation.

Similarly, inverted LUT 19 is concatenated with monitor translator 33 such that it is viewed as performing translations between the printer color space to the editing color space (i.e., the monitor space).

The system of the present invention also includes stored reference image file data 14. This data contains the color value and pixel information necessary to tell a display device how to display a particular color image. This data is stored in a memory storage 14 in source color data form. For the embodiment shown in FIGS. 1 and 2, this data is an RGB color value. Reference image file 14 generally includes more than one image to facilitate color matching. This is necessary since the appearance of displayed colors often depends on the type of image being displayed.

In the embodiment shown in FIG. 1, editing is performed using a graphical representation corresponding to the RGB color space which corresponds to the source device's color space (i.e., the monitor). However, in another embodiment, editing may be performed in a color space other than the source or destination color spaces.

In other words, the graphical representation may be displayed in a color space different than the source or destination color space. To perform editing in a third color space, color translator 31 (FIG. 2) is used.

Referring to FIG. 2, color space translator 31 is shown being coupled between tables 16 and tool 17. Color space translator 31 is shown in dashed lines to indicate that it is only used in embodiment its in which the graphical representation is displayed in something other than the color space of the destination device. Translator 31 converts the color space information in table 16 to the color space that the user wants to perform edits in. The translated color space information is transmitted to tool 17, causing tool 17 to display the graphical representation of the LUT in the desired editing color space.

Conversely, translator 31 translates information from tool 17 back to the color space of table 16. Translator 31 may be implemented as a standardized color space look-up table or may also be implemented by performing well-known mathematical color space conversion computations.

FIG. 3 illustrates the method of the present invention corresponding to FIG. 2. Step 1 indicates that to perform the method of the present invention it is necessary to first initialize a 3-D graphics application and to initialize the color table modeling session. The user does this by using I/O device 20 to command the computer's operating system to begin the look-up table editing program. This instruction is provided to management tool 17.

It should be noted that graphics management tool 17 may include the 3-D graphics application tool along with the graphics management tool. However, in another embodiment of the present invention, the 3-D graphics application may instead be included in the computer's operating system. In this embodiment, tool 17 coordinates activities between the display screen and the 3-D graphics application, coordinating both to perform the specific tasks required of the system of the present invention.

After initiating the editing session, tool 17 displays a lattice based on the previously created LUT (step 2). This is accomplished by the three-dimensional graphical application tool. It is well-known in the art how to convert a table of digital values into some sort of graphical representation.

Next, the user chooses a specific set of reference images (step 3). This choice should take into consideration the type of images that the destination device will eventually be printing. In this way, the color LUT may be edited with consideration of typical images that may be displayed by the printer. Step 4 entails displaying the reference images. Referring to FIG. 2, reference images are displayed by first translating the reference image color information into an HVS color space, using translator 32. Next, the information is translated into monitor color space by translator 33.

Step 4 also includes displaying the sample images. This is accomplished by processing the color data corresponding to the reference images through translator 32, the color LUT stored in memory storage 16, through the inverted color LUT stored in memory storage 19 and then through monitor translator 33.

Step 4 is performed in a series of steps. Referring to FIG. 2, first the reference image data is converted from RGB to printer color space by table 16 and translator 32. Next the data is translated back from printer color space to RGB by table 19 and translator 33. These translations provide display 13 with sample image color data information that represents the manner in which the images would be printed by the printer in accordance with the stored LUT 16.

Next, the user has the option to choose the resolution in which to work (step 5). For instance, if the user wants to make coarse adjustments to the LUT, the lattice structure shown in FIG. 1 is displayed having only a few color spheres—each color sphere representing many color values. For finer adjustments, more spheres are displayed.

Step 6 is the editing stage. The user has the option to manipulate the spheres in the table by choosing a sphere and then pulling it in different directions. Moving the spheres causes corresponding color changes within LUT 16. Graphics management tool 17 up-dates table 16 as the lattice structure is manipulated. The user has the option to use all of the manipulation tools as described above, i.e.. zooming-in, rotation, hiding portions of the lattice structure.

While moving the spheres of the graphical representation the color of the sphere changes as it is moved, depending on the direction it is moved. For instance, if the sphere is moved along the red axis then it will have an increased or decreased red hue. If it is moved somewhere between the red and blue axis, then the sphere has either an increased or decreased purple hue.

Another aspect of the present invention is that when a given sphere is moved within the graphical representation, adjacent spheres to the given sphere are moved in a scaled manner. For instance, if a certain sphere is move in the red direction, adjacent spheres are also moved in the red direction by a smaller amount. Manipulating the spheres in this manner eliminates abrupt color changes within the table from one color value to another.

After the user changes the lattice structure, the reference image is once again processed through tables 16 and 19 (step 7). This step includes first, creating a new inverted color table 19 corresponding to the edited LUT. Next, the reference image data is processed through the new tables 16 and 19. This step causes the sample images to be displayed on display screen 13 based on the updated tables 16 and 19.

If the sample images do not acceptably match the reference images after steps 5-7 are performed, step 8 indicates that steps 5-7 should be repeated again. Thus, the user has the option of resetting the resolution and making more adjustments to the LUT. Finally, after all of the edits are made, the LUT is saved.

It should be noted that the user may choose to print the sample images directly to the printer in step 7 instead of displaying them on the screen. Referring to FIG. 2, the output of table 16 is coupled to the input of table 19 and also to printer 18 on bus 27. Since table 16 converts the reference image HVS data to printer color space data, the data on bus 27 is compatible with printer 18. Thus, the user has the option of having the sample images printed onto the printer or to the display screen.

Although the elements of the present invention have been described in a conjunction with certain embodiments, it is appreciated that the invention may be implemented in a variety of other ways. Consequently, it is to be understood that the particular embodiments shown and described by way of illustration are in no way intended to be considered limiting. Reference to the details of these embodiments is not intended to limit the scope of the claims which themselves recite only those features regarded as essential to the invention.

I claim:

1. In a computer system having at least a first device and a second device for displaying color, said system employing a color look-up table (LUT) to translate color data corresponding to said first device into color data corresponding to said second device, a system for on-line editing of said color LUT comprising:

a means for displaying color images;

a means for causing said display means to display a set of different color reference images, each of said images representing an image type wherein the manner in which colors are visually perceived within each image is dependent on each image's type, said set of color reference images being displayed in a manner characterized by said first display device, said reference images having corresponding color data information;

means for generating an inverted color LUT corresponding to said color LUT;

a means for causing said display means to display a set of color sample images by processing said reference image's color data information through said color LUT and said inverted color LUT such that said set of color sample images are displayed in a manner characterized by said second display device;

means for causing said display means to display a graphic representation of said color LUT, which comprises elements respectively represent colors in said color LUT and which are connected together by axes that are respectively disposed in at least three dimensions;

means for performing input/output (I/O) interfacing with said display means, said (I/O) interface means changing said graphical representation of said LUT, wherein when said graphical representation of said LUT is changed, said color LUT is updated.

2. The system as described in claim 1 wherein said display means displays said graphical representation of said color LUT in a color space other than color spaces corresponding to said first or second device.

3. The system as described in claim 2 wherein said graphical representation is a lattice structure including a multiplicity of elements, each of said elements corresponds to color values associated with said color LUT.

4. The system as described in claim 1 wherein said graphical representation has an associated resolution and said associated resolution is dependent on the number of said elements said graphical representation comprises.

5. The system as described in claim 4 wherein said first device is a computer monitor and said second device is a printer.

6. The system as described in claim 4 wherein said first and second devices are printers.

7. In a computer system having at least a first device and a second device for displaying color, said system employing a color look-up table to translate color data corresponding to said first device into color data corresponding to said second device, a method for on-line editing of said color LUT essentially comprising the steps of:

providing a display screen for editing said color LUT;

providing a color LUT, said color LUT translating color data corresponding to said first device into color data corresponding to said second device, said color LUT storing color values corresponding to said second device;

generating an inverted color LUT using said color LUT, said inverted color LUT translating color data corresponding to said second device into color data corresponding to said first device;

displaying a graphical representation of said color LUT, said graphical representation including a multiplicity of elements, each of said elements corresponding to at least one of said color values stored in said color LUT, and being connected together by axes that are respectively disposed in at least three dimensions;

displaying a set of different references images, each of said images representing an image type wherein the manner in which colors are visually perceived within each image is dependent on each image's type, and each of said set of reference images being defined by color data information;

displaying a set of sample images, said set of sample images being displayed by processing said reference image's color data information through said color LUT and said inverted color LUT;

editing said color LUT to generate an edited color LUT by changing the position of at least one of said elements in said graphical representation, wherein changing said element's position causes a corresponding change in said at least one of said color data values associated with said color LUT;

generating a new inverted color LUT corresponding to the edited color LUT;

displaying a new set of sample images, said new set of sample images being displayed by reprocessing said reference image's color data information through said edited color LUT and said new inverted color LUT.

8. The method as described in claim 7 wherein the step of displaying a set of sample images by processing said reference image's color data information through said color LUT and said inverted color LUT also includes the steps of first translating said color data information associated with said set of reference images into color data associated with a human visual system (HVS) color space, next processing said color data associated with said HVS color space through said color LUT to generate color data associated with said second device, next processing said color data associated with said second device through said inverted color LUT to generated color data associated with said HVS color space and finally translating said color data associated with said HVS color space into color data associated with said display means color space.

9. The method as described in claim 8 wherein said editing step further includes the step of adjusting the resolution of said graphical representation by adjusting the number of said elements in said graphical representation.

10. The method as described in claim 9 wherein said each of said color values of said color LUT comprises at least three components and wherein said graphical representation comprises at least three axes, and wherein said at least three axes corresponds to said at least three components.

11. The method as described in claim 10 wherein said display means displays said graphical representation of said color LUT in a color space other than color spaces corresponding to said first or second device.

12. The method as described in claim 11 wherein said graphical representation is a lattice structure including a multiplicity of elements, each of said elements corresponds to color values associated with said color LUT.

13. The method as described in claim 7 wherein said graphical representation has an associated resolution and said associated resolution is dependent on the number of said elements said graphical representation comprises.

14. The method as described in claim 13 wherein said first device is a computer monitor and said second device is a printer.

15. The method as described in claim 13 wherein said first and second devices are printers.

* * * * *